(12) United States Patent
Ahlström et al.

(10) Patent No.: US 8,204,062 B2
(45) Date of Patent: Jun. 19, 2012

(54) QUALITY OF SERVICE HANDLING IN A S4-SERVING GENERAL PACKET RADIO SERVICE SUPPORT NODE

(75) Inventors: Folke Ahlström, Västra Frölunda (SE); Josefin Karlsson, Torslanda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/301,817

(22) Filed: Nov. 22, 2011

(65) Prior Publication Data
US 2012/0127861 A1 May 24, 2012

Related U.S. Application Data

(60) Provisional application No. 61/416,760, filed on Nov. 24, 2010.

(30) Foreign Application Priority Data

Nov. 18, 2011 (WO) ................. PCT/EP2011/070448

(51) Int. Cl.
*H04L 12/28* (2006.01)
*H04L 12/26* (2006.01)

(52) U.S. Cl. .................................. 370/395.21; 370/235
(58) Field of Classification Search ........................ None
See application file for complete search history.

(56) References Cited

U.S. PATENT DOCUMENTS
2005/0047337 A1*  3/2005  Virtanen ....................... 370/229

FOREIGN PATENT DOCUMENTS
EP         1534040 A1       5/2005
WO     WO 0036846 A2       6/2000

OTHER PUBLICATIONS

"Correction for mapping between PDP contexts and EPS bearers"; China Mobile, 3GPP Apr. 3, 2009.
3GPP TS 23.060 v10.1.0 (Sep. 2010); GPRS; Service description; Stage 2 (Release 10); Sep. 29, 2010.

* cited by examiner

*Primary Examiner* — Clemence Han (57) ABSTRACT

Example embodiments presented herein are directed towards a S4 Serving General Packet Radio Service Support (S4-SGSN) node, and method, for radio resource management. Specifically, the S4-SGSN may be configured to restrict or reject a Packet Data Protocol (PDP) activation or a PDP modification procedure based on a Quality of Service (QoS) analysis.

14 Claims, 9 Drawing Sheets

QUALITY OF SERVICE HANDLING IN A S4-SERVING GENERAL PACKET RADIO SERVICE SUPPORT NODE

RELATED APPLICATIONS

This application claims the benefit of U.S. Provisional Application No. 61/416,760, filed on Nov. 24, 2010 and PCT Application No. PCT/EP2011/070448, filed on Nov. 18, 2011. The entire teachings of the above applications are incorporated herein by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

Mobility management is an important function in maintaining cellular networks. The goal of mobility management is to track where cellular phones, or user equipments, are located in order for mobile phone services to be provided to the various user equipments comprised in any given network. The network nodes which are primarily responsible for mobility management are the Mobility Management Entity (MME) and the Serving General Packet Radio Service Support Node (SGSN).

SUMMARY

Current 3GPP specifications only allow for the MME to downgrade subscribed ARP and APN-AMBR, received from the HSS, before forwarding this information to the SGW and onwards to the PGW during attach. In 3GPP, it is not clear how to handle mobility procedures other than Attach, for example, a standalone user equipment requested PDN connectivity request. In the present specification the HPLMN should not upgrade the bearer level QoS or APN-AMBR above this provided value or there will be a risk that the S4-SGSN will reject the bearer establishment or even detach the user equipment.

The inventors herein have discovered that at least two things are missing in the current specification. First, in a shared network scenario, a user equipment may move from one operator's network to another one's without loosing connectivity, e.g. during S1-based EUTRAN handover or at handover between E-UTRAN, UTRAN and GERAN. In these types of mobility scenarios the present 3GPP standards lacks the means for the target operator network to communicate the maximum allowed QoS that is in line with roaming agreements to the PGW (and PCRF in case dynamic PCC is deployed).

Secondly, the scenario of when the maximum allowed QoS that can be requested by a HPLMN operator exceeds the subscribed QoS of a user is not currently specified in the 3GPP standard. In this case, there is no means but to reject a request for an S4-SGSN.

Thus, some of the example embodiments presented herein provide a user equipment the ability to move to a new S4-SGSN which may be able to select QoS parameters which shall be applied and to unambiguously provide those parameters to the P-GW and/or PCRF. The purpose is to allow the S4-SGSN to inform the PGW of the QoS parameters that, for example, are in line with a roaming agreement (in case of roaming) and that could be acceptable by the serving network. This may be realized by sending modified QoS parameters from the S4-SGSN to the PGW/PCRF in order to indicate what can be accepted for the user equipment. The QoS parameters may be indicated by using different 3GPP defined procedures.

Thus, some of the example embodiments may be directed towards a method in a Serving General Packet Radio Service Support (SGSN) node for radio resource management, the SGSN node being comprised in a radio network. The method comprises receiving a notification of a secondary Packet Data Protocol (PDP) activation or a PDP content modification procedure and determining a maximum allowed Quality of Service (QoS) associated with a user equipment requesting service. The method further comprises determining a decision on the secondary PDP activation or the PDP content modification procedure based on the maximum allowed QoS.

Some of the example embodiments may be directed towards a Serving General Packet Radio Service Support (SGSN) node for radio resource management, the SGSN node being comprised in a radio network. The SGSN node comprises a receiving port configured to receive a notification of a secondary Packet Data Protocol (PDP) activation or a PDP content modification procedure and a determination unit configured to determine a maximum allowed Quality of Service (QoS) associated with a user equipment requesting service. The determination unit is further configured to determine a decision on the secondary PDP activation or the PDP content modification procedure based on the maximum allowed QoS.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

Figure 1:
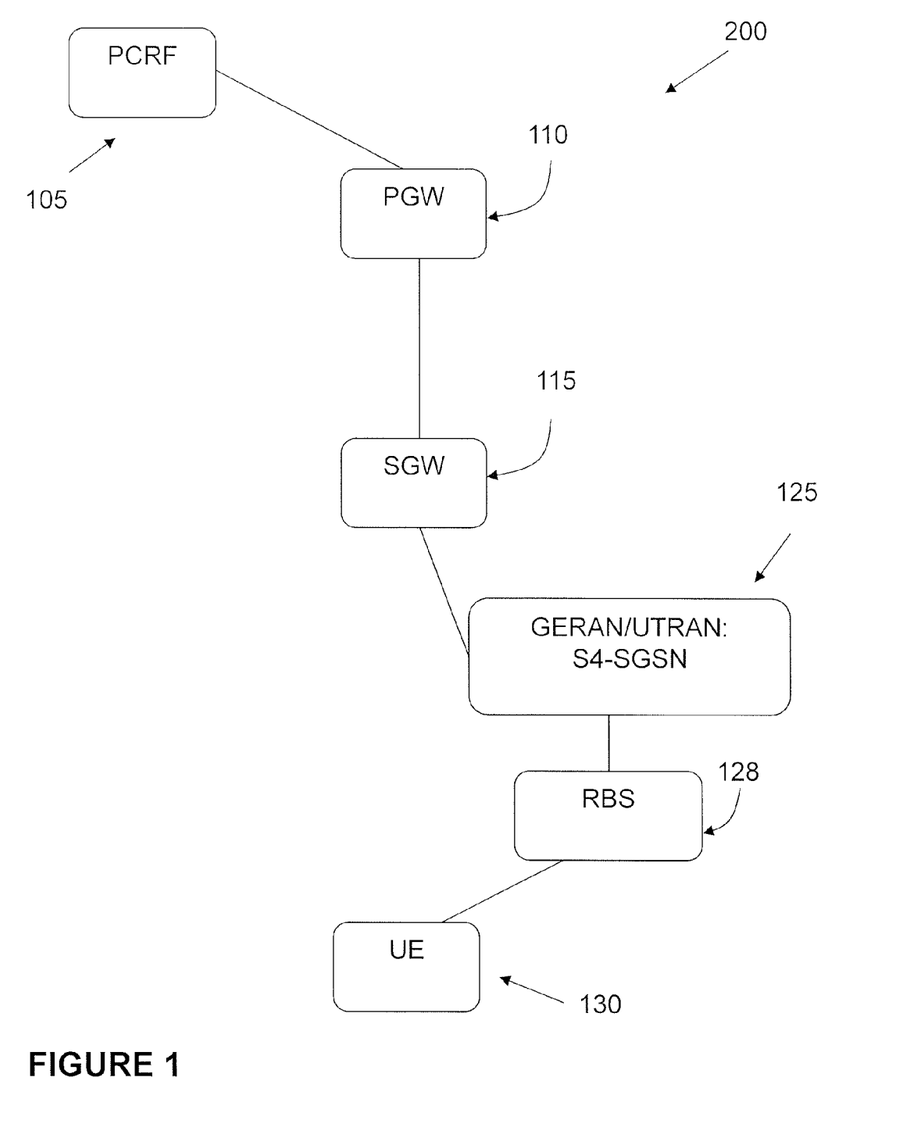
FIG. 1 is a schematic of an example wireless network.

FIG. 1 shows a schematic view of a first system 100 in which some of the example embodiments may be applied. The system 100 is a so called 2G/3G system, also sometimes referred to as a GERAN/UTRAN system. As shown, the system 100 can accommodate a number of user equipments one of which is shown as an example, with the reference number 130. Naturally, the system 200 can accommodate a large number of user equipments and is not limited to accommodating only one user equipment.

All traffic to and from the user equipment 130 is routed via a so called "base station", which, depending on the nature of the system, has different names. In the case of a GERAN/UTRAN system such as the one in FIG. 1, the base station is in this text referred to by the generic name "Radio Base Station", here and in FIG. 1 abbreviated as RBS. The RBS which the user equipment 130 is connected to is shown in FIG. 1 as RBS 128. One example of a system specific name for an RBS is NodeB, as used in 3G systems, and another example is BTS, Base Transceiver System, as used in some 2G systems.

Regardless of the kind of system, the mobility of the user equipment 130 is controlled by what will here initially be referred to generically as a "mobility management node", which, as shown in FIG. 1, in the case of GERAN/UTRAN is a so called S4-SGSN, shown as 125 in FIG. 1.

The "mobility management node" is connected to a Serving Gateway, an SGW 115, which in turn is connected to a PDN Gateway, PGW 110. The PGW 110 can be connected to a unit or a function for Policy and Charging Rules Function, a so called PCRF 105, or the PGW 110 can be arranged to take certain policy and charging actions on its own without the use of a PCRF.

An example purpose of some of the example embodiments presented herein is to facilitate the mobility of the user equipment within the wireless system, or between other wireless systems of either the same kind or of different kinds (i.e., mobility between a GERAN/UTRAN system and a EUTRAN system). An example of a mobility procedure may be when a user equipment has moved into a network or system which does not belong to his "own" operator. Another example may be when a user equipment establishes a data connection to the system, but is located in a network or system which does not belong to his "own" operator. A further example may be when a user equipment is in so called "idle mode" and the user equipment moves into a network or system which does not belong to his "own" operator. In the idle example, a so called Routing Area Update (in the case of GERAN/UTRAN systems) or a Tracking Area Update (in the case of EUTRAN system) may be performed. Yet another example may be when an active user equipment moves into a network or system which does not belong to his "own" operator (i.e., during a handover procedure). A further example may be when a user equipment moves into a part of the network or system which does not support a previously provided Quality of Service (QoS).

In cases such as the example cases provided above, the system or network into which the user has moved may have parameters or limits on the QoS for user equipments which differ from the parameters which the user equipment used before the move. Such "misalignments" of the user equipment QoS parameters may not be desirable, and may in the worst case lead to a connection being terminated.

Example embodiments are presented herein to provide improved handling during mobility procedures in radio networks. Specifically, some of the example embodiments presented herein allow for an S4-SGSN node to select QoS parameters which may be applied unambiguously to a PGW and/or PCRF. Some example embodiments may be directed towards a S4-SGSN rejecting a mobility procedure based on QoS parameters.

Figure 2:
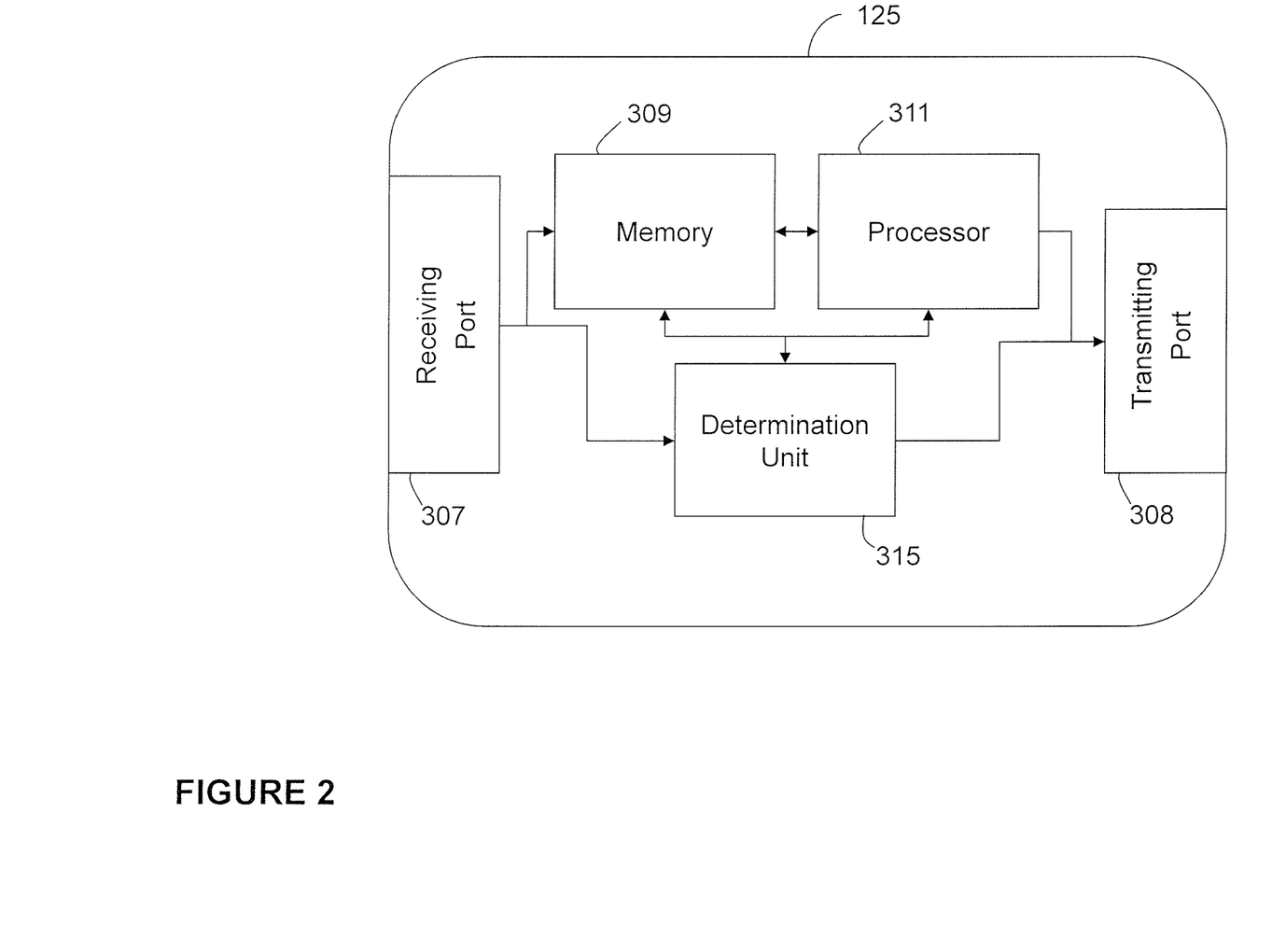
FIG. 2 is a schematic of a S4-SGSN node, according to some of the example embodiments.

FIG. 2 is an illustrative example of S4-SGSN network node 125 according to some of the example embodiments. The network node 125 may comprise any number of communication ports, for example a receiving port 307 and a transmitting port 308. The communication ports may be configured to receive and transmit any form of communications data. It should be appreciated that the network node 125 may alternatively comprise a single transceiver port. It should further be appreciated that the communication or transceiver port may be in the form of any input/output communications port known in the art.

The network node 125 may further comprise at least one memory unit 309. The memory unit 309 may be configured to store received, transmitted, and/or measured data of any kind and/or executable program instructions. The memory unit 309 be any suitable type of computer readable memory and may be of a volatile and/or non-volatile type.

The network node 125 may also comprise a determination unit 315 that may be configured to compare and possibly modify QoS parameters during the establishment or modification of network bearers. The network node 125 may further comprise a general processing unit 311.

It should be appreciated that the determination unit 315 and/or the processing unit 311 may be any suitable type of computation unit, e.g. a microprocessor, digital signal processor (DSP), field programmable gate array (FPGA), or application specific integrated circuit (ASIC). It should also be appreciated that the determination unit 315 and/or the processing unit 311 need not be comprised as separate units.

The determination unit 315 and/or the processing unit 311 may be comprised as a single computational unit or any number of units.

Figure 3:
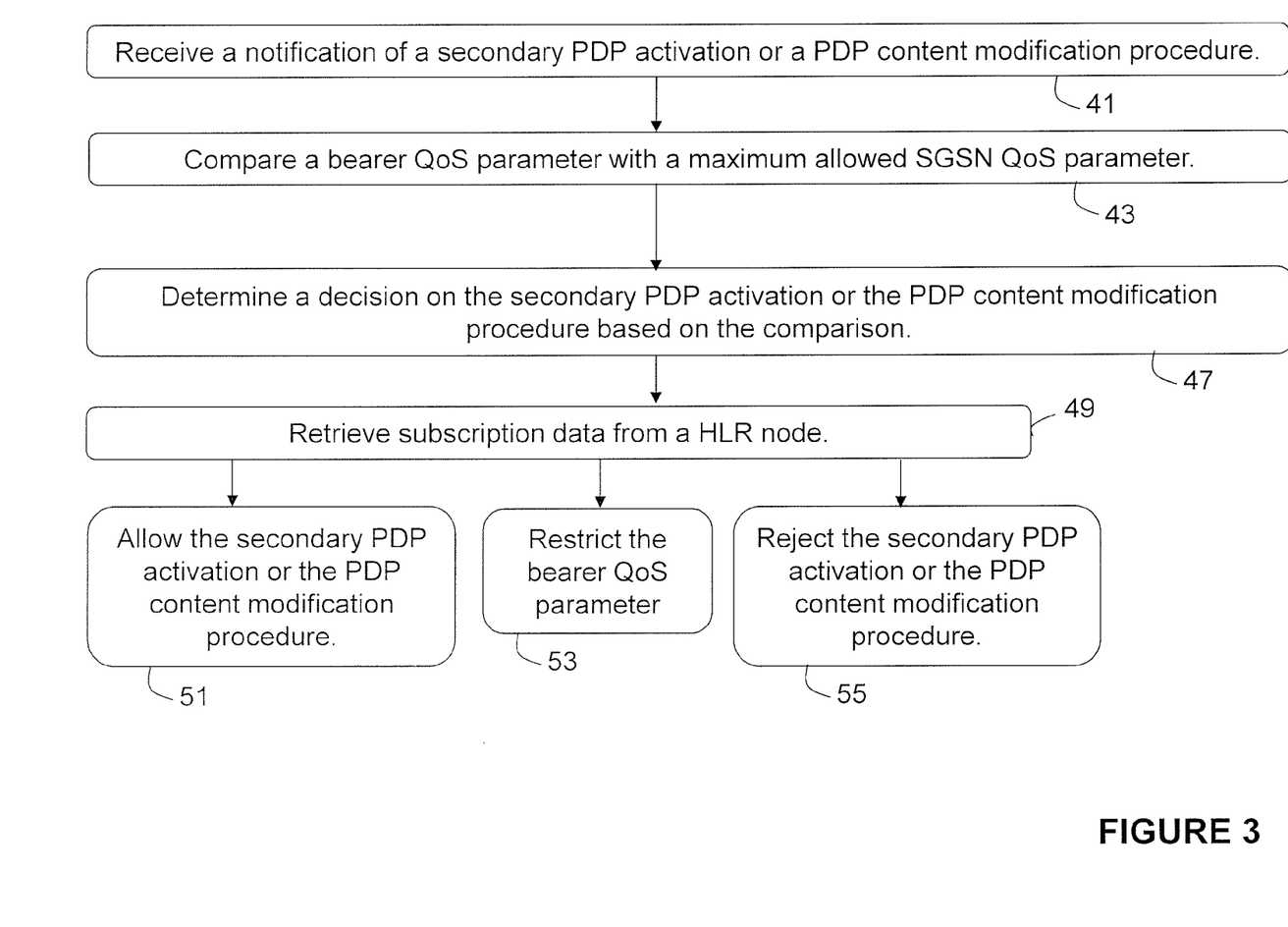
FIG. 3 is a flow diagram depicting example operational steps which may be taken by the S4-SGSN node of FIG. 2 according to some of the example embodiments.

FIG. 3 is a flow diagram depicting example operational steps which may be taken by the S4-SGSN network node of FIG. 2, according to some of the example embodiments. The example operations will be described below according to the corresponding heading.

Example Operation 41

Some of the example embodiments may comprise the S4-SGSN node 125 receiving 41 a notification of a secondary Packet Data Protocol (PDP) activation or a PDP content modification procedure, where the notification comprises a bearer Quality of Service (QoS) parameter. The receiving port 307 is configured to perform the receiving 41.

It should be appreciated that the secondary PDP activation or the PDP content modification procedure may be a network initiated or user equipment initiated. It should further be appreciated that the network initiated PDP content modification may be a SGSN initiated modification, a PGW initiated modification, or a RAN initiated Radio Access Bearer (RAB) modification.

Example Operation 43

Some of the example embodiments further comprise the S4-SGSN node 125 comparing 43 the bearer QoS parameter with a maximum allowed SGSN QoS parameter associated with the S4-SGSN node 125. The determination unit 315 is configured to perform the comparing 43.

Example Operation 47

Some of the example embodiments further comprise the S4-SGSN node 125 determining 47 a decision on the secondary PDP activation or the PDP content modification procedure based on the comparing 43. The determination unit 315 is configured to perform the determining 47.

Example Operation 49

According to some of the example embodiments, the steps of comparing 43 and determining 47 may further comprise the S4-SGSN node 125 retrieving 49 user equipment subscription data from a Home Location Register (HLR) network node.

Example Operation 51

According to some of the example embodiments, the step of determining 47 may further comprising allowing 51 the secondary PDP activation or the PDP content modification procedure if the bearer QoS parameter is less than or equal to the maximum allowed SGSN QoS parameter. The determination unit 315 may be configured to perform the step of allowing 51.

Example Operation 53

According to some of the example embodiments, the step of determining 47 may further comprise restricting 53 the secondary PDP activation or the PDP content modification procedure if the bearer QoS parameter is greater than the maximum allowed SGSN QoS parameter. The determination unit 315 may be configured to perform the step of restricting 53.

Example Operation 55

According to some of the example embodiments, the step of determining 47 may further comprise rejecting 55 the secondary PDP activation or the PDP content modification procedure if the QoS parameter is greater than the maximum allowed SGSN QoS parameter.

Figure 4:
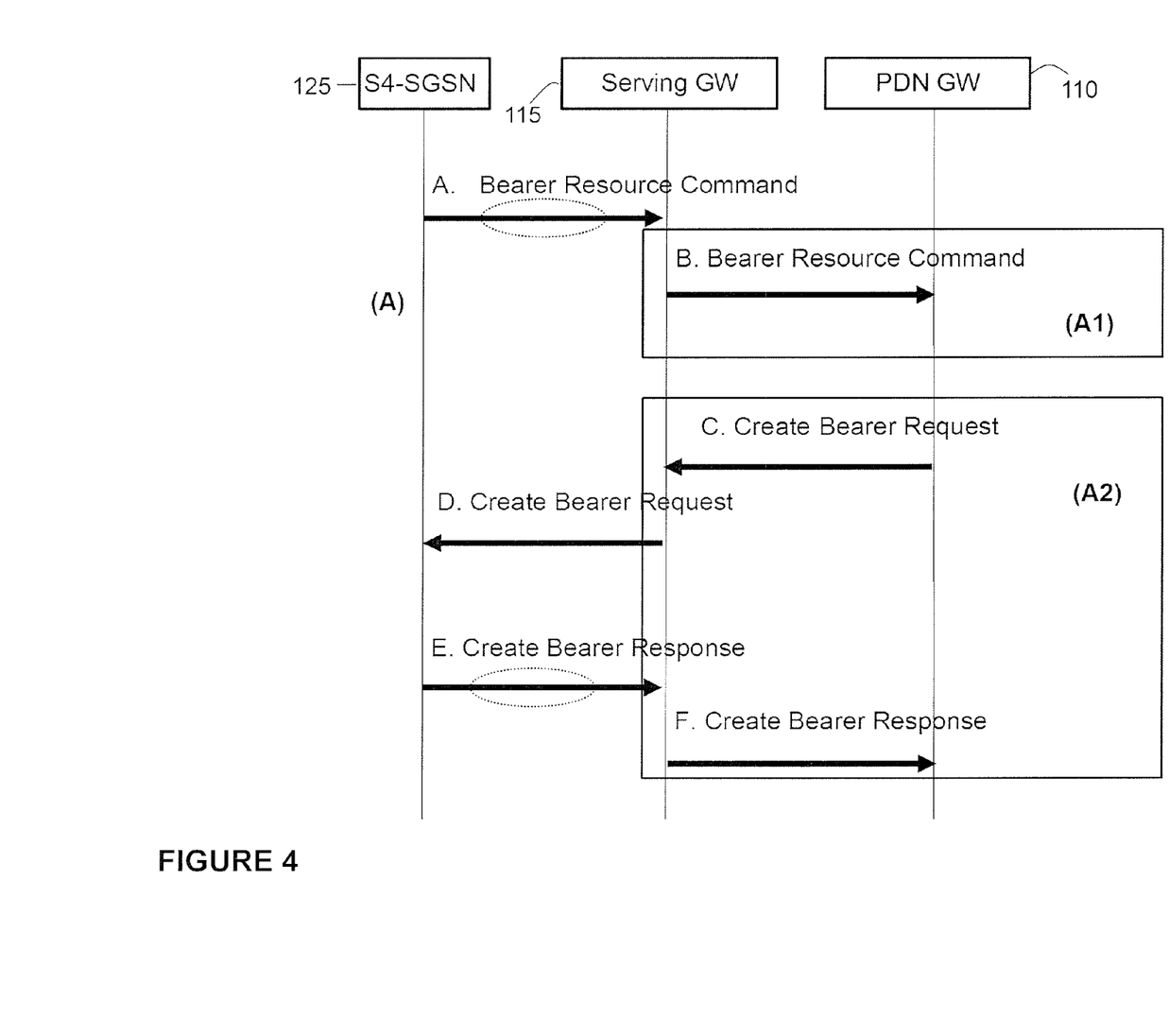
FIGS. 4-9 are message sequence diagrams illustrating communications among various network nodes, according to some of the example embodiments.

FIGS. 4-9 provide illustrative examples of message sequences which utilize some of the example embodiments described above. In FIGS. 4-9, messages which are illustrated with a dashed circle provide examples of messages which may utilize some of the example embodiments presented herein. FIG. 4 is an example of messages involving the S4-SGSN in a secondary PDP Context Activation Procedure. As shown in the figure, the S4-SGSN may validate an Active Secondary PDP Context Request by issuing a Bearer Resource Command (message A).

The validation procedure may occur as a result of a PDP Context Activation request originating from a user equipment. During the validation process, the S4-SGSN may obtain a bearer QoS parameter associated with the user equipment initiating the PDP Context Activation Procedure. Thus, according to some of the example embodiments, the S4-SGSN may thereafter compare the bearer QoS parameter with a maximum allowed S4-SGSN QoS parameter that may be stored locally in the S4-SGSN node itself. If the bearer QoS parameter is higher than the maximum allowed S4-SGSN QoS parameter, the S4-SGSN may restrict the bearer QoS parameter. Specifically, the S4-SGSN may indicate that a bearer QoS parameter should be lowered, resulting in a lower allowed bit rate of communication. This indication may be provided in the form of an information element, a flag, or any other parameter or method of indication known in the art. This indication may be provided to the SGW.

Thereafter, the SGW may send the Bearer Resource Command to the PGW (message B). The PGW may determine the EPS Bearer needs (which may comprise QoS) which need to be established. The PGW may interact with the PCRF in establishing EPS Bearer needs.

If the request is accepted, the PGW may thereafter invoke a Dedicated Bearer Activation Procedure to establish a new EPS Bearer by sending a message to the SGW (message C). The PGW may restrict or increase, and negotiate the requested QoS. If the PCRF was contacted, the EPS Bearer QoS may be updated according to the QoS of the received PCC rules. It should be appreciated that any adjustments made to the QoS, by the PGW, may also take into account information or restrictions provided by the S4-SGSN.

The SGW may send a Create Bearer Request to the S4-SGSN (message D). The S4-SGSN may acknowledge the bearer activation to the SGW by sending a Create Bearer Response message (message E). However, if the received Bearer Level QoS parameters are higher than the maximum allowed S4-SGSN QoS, which may be configured in the S4-SGSN, the S4-SGSN may reject the bearer modification request, according to some of the example embodiments. Thereafter, the SGW may acknowledge the bearer activation by sending a Create Bearer Response message to the PGW (message F).

Figure 5:
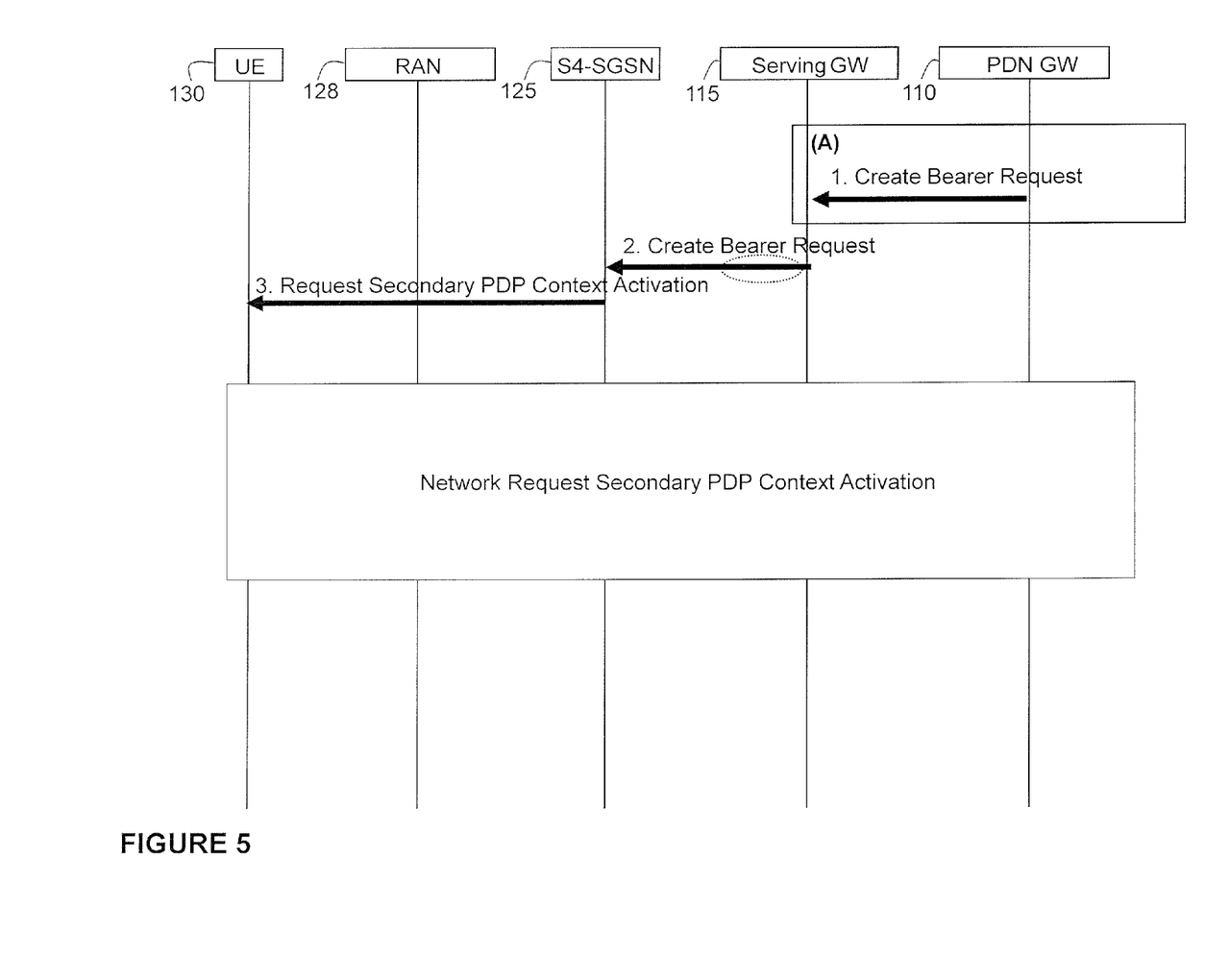

FIG. 5 illustrates an example of a network requested Secondary PDP Context Activation Procedure utilizing the S4-SGSN network node. First, the PGW may send a Create Bearer Request to the SGW using QoS policy (which may be obtained from the PCRF) to assign an EPS Bearer QoS (message 1). Thereafter, the SGW may send a Create Bearer Request to the S4-SGSN (message 2). According to some of the example embodiments, if the received Bearer Level QoS parameters are higher than the maximum allowed S4-SGSN QoS, which may be configured in the S4-SGSN, the S4-SGSN may rejected the dedicated activation request. If the activation request is not rejected, the S4-SGSN may send a Request Secondary PDP Context Activation message to a user equipment (message 3). The remainder of the Network Requested Secondary PDP Context Activation Procedure may be performed in a similar manner as is currently performed in the art.

Figure 6:
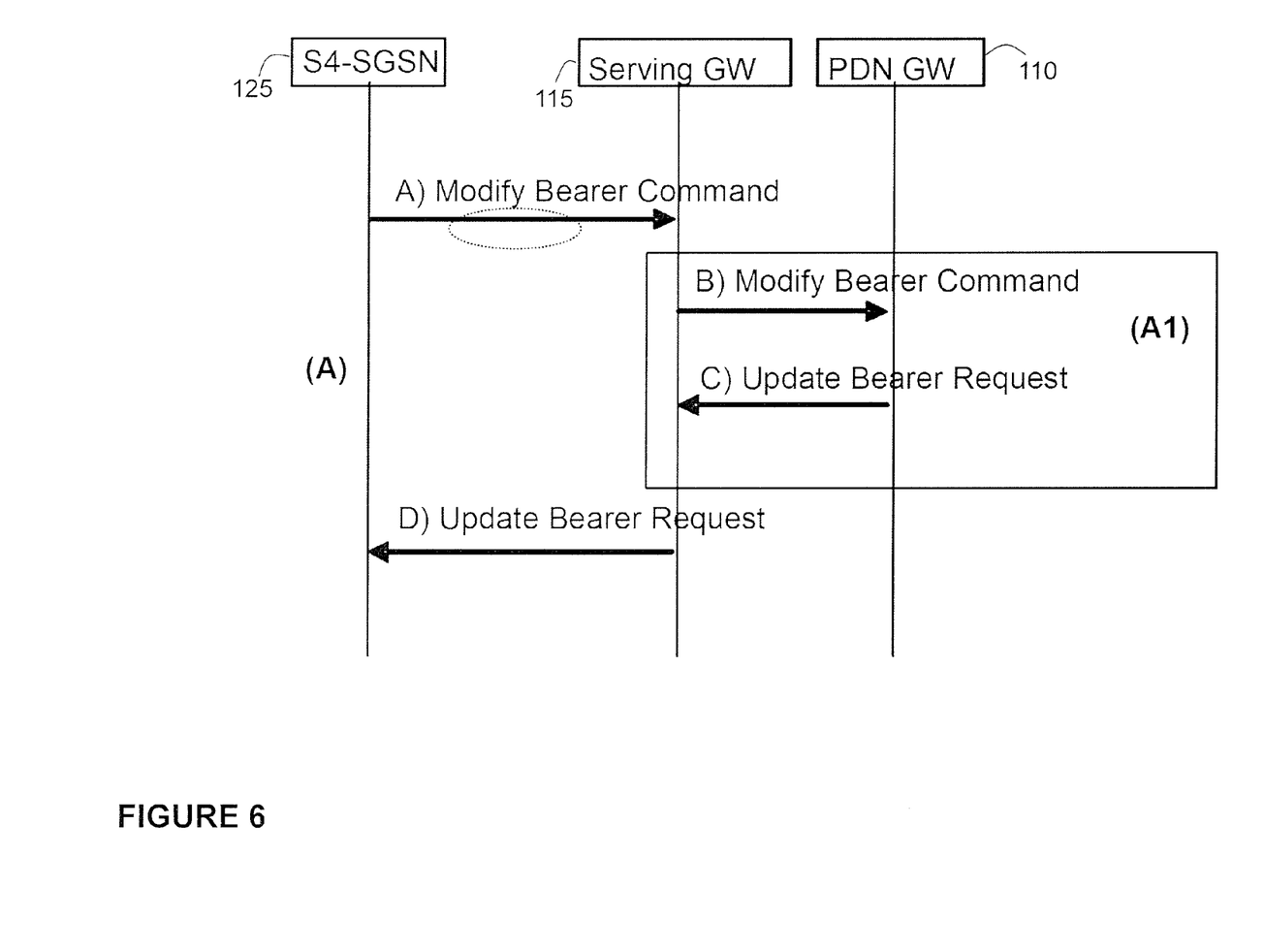

FIG. 6 illustrates an example of a S4-SGSN initiated EPS Bearer Modification Procedure. First, the S4-SGSN node may send a Modify Bearer Command message to the SGW (message A). According to some of the example embodiments, the S4-SGSN may restrict the EPS Bearer QoS comprised in the Modify Bearer Command if the maximum allowed S4-SGSN QoS parameter, which may be configured in the S4-SGSN, indicates restriction is possible.

Thereafter, the SGW may send the Modify Bearer Command to the PGW (message B). The PGW may interact with the PCRF to obtain any necessary subscription related data. The PGW may send an Update Bearer Request to the SGW (message C). The Update Bearer Request may the EPS Bearer QoS parameter which may be determined with the use of the restriction provided by the S4-SGSN. The SGW may thereafter send the Update Bearer Request to the S4-SGSN (message D). Thereafter, an Update Bearer Response may be sent from the S4-SGGSN to the SGW node. The SGW node may thereafter forward the response to the PGW node.

Figure 7:
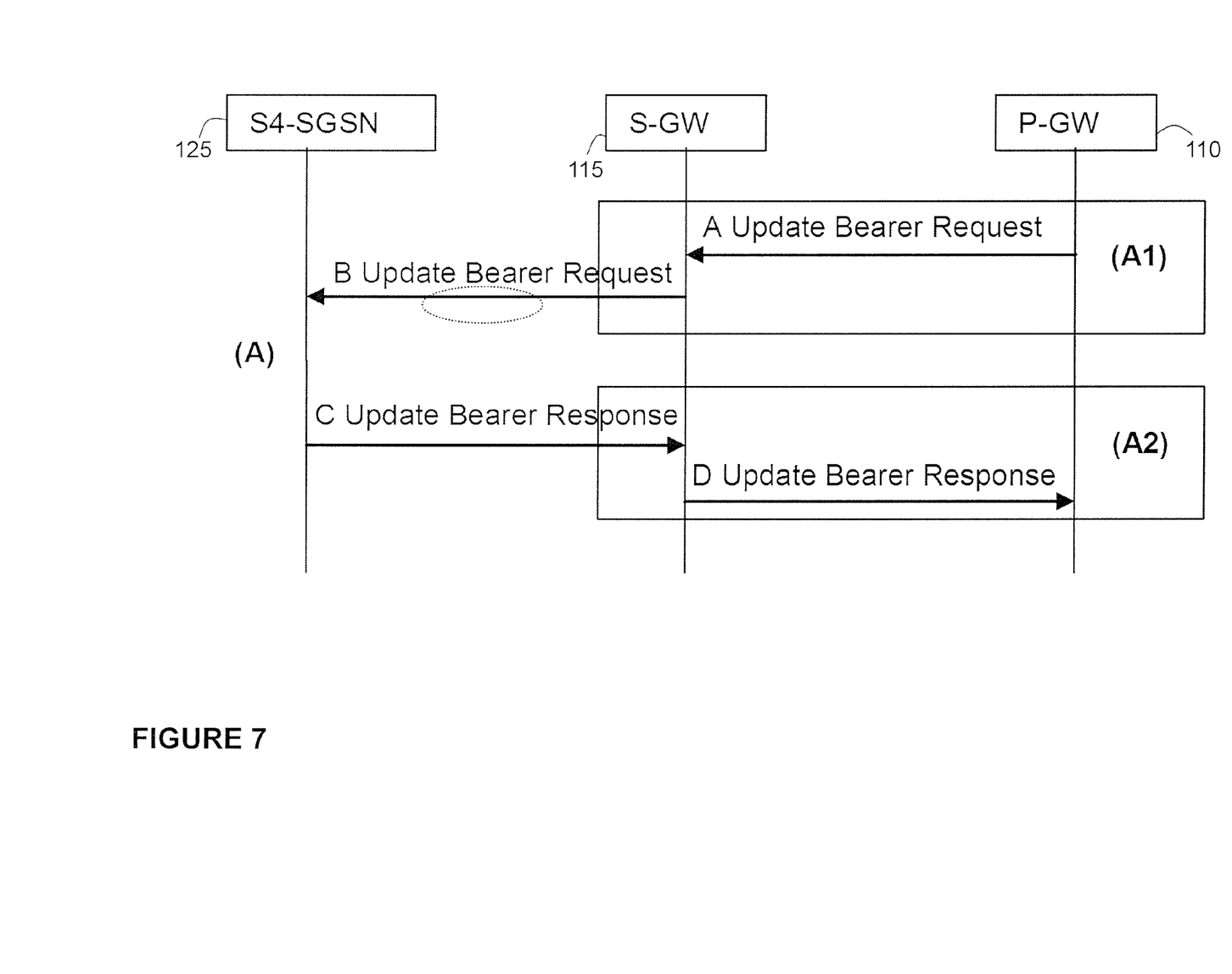

FIG. 7 illustrates a PGW initiated EPS Bearer Modification Procedure. As illustrated, the PGW may first send an Update Bearer Request to a SGW node (message A). The Update Bearer Request may comprise an EPS Bearer QoS parameter. The SGW may send the Update Bearer Request message to the S4-SGSN (message B). If the received Bearer QoS parameter is higher than the maximum allowed S4-SGSN QoS parameter, which may be configured in the S4-SGSN, the S4-SGSN may reject the bearer modification request, according to some of the example embodiments.

If the bearer modification request is not rejected, the S4-SGSN may acknowledge the request by sending an Update Bearer Response message to the SGW (message C). The SGW may also acknowledge the bearer modification by sending an Update Bearer Response to the PGW (message D).

Figure 8:
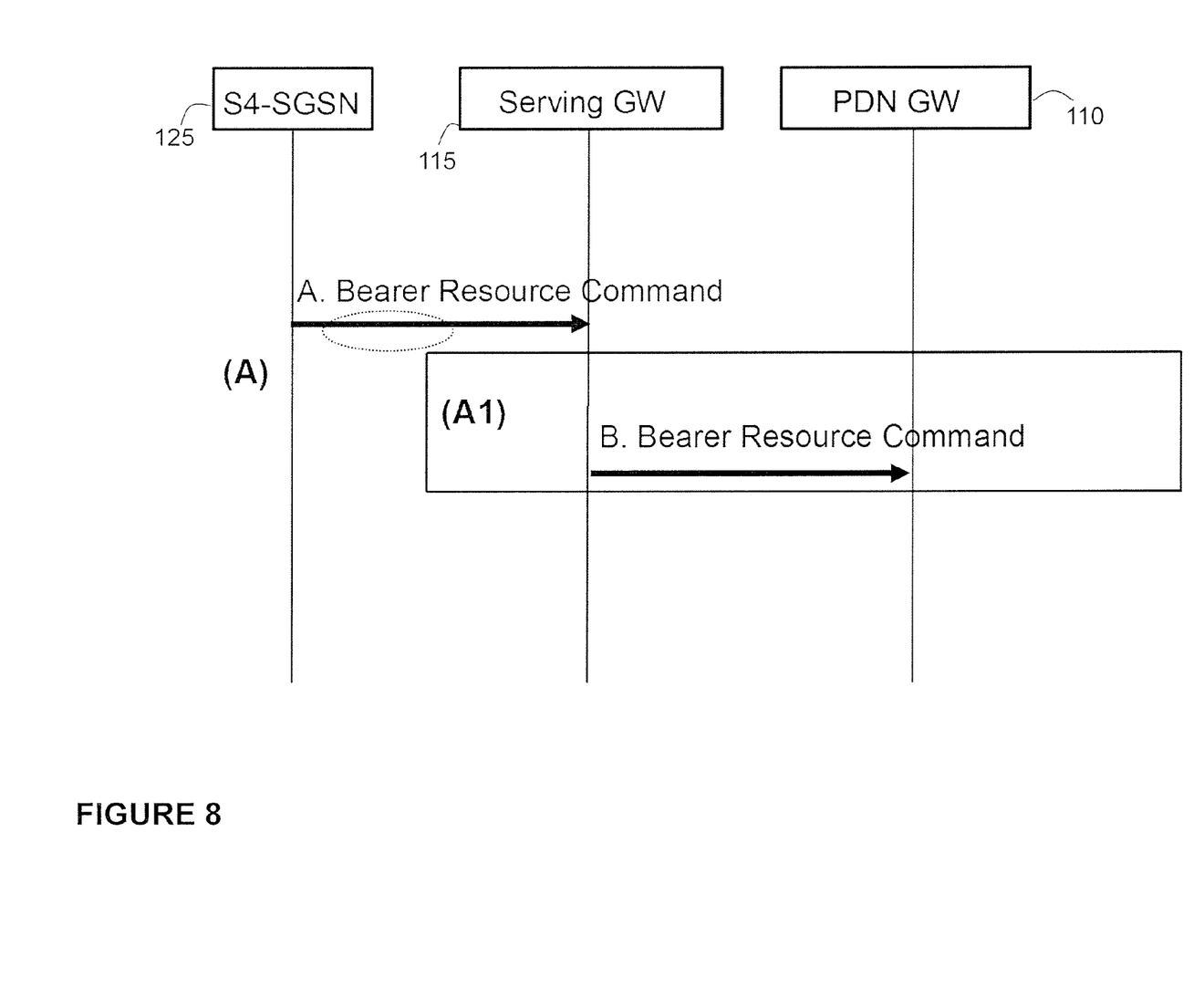

FIG. 8 illustrates an example of a request portion of a user equipment initiated modification procedure using an S4-SGSN network node. First, the S4-SGSN node may identify the bearer modification scenario which may be applied and send the Bearer Resource Command to the SGW node (message A). According to some of the example embodiments, the S4-SGSN node may restrict the user equipment requested QoS profile if the maximum allowed S4-SGSN QoS parameters indicate this is possible or needed. Thereafter, the SGW node may send the Bearer Resource Command message to the PGW node (message B). The PGW may interact with the PCRF in order to obtain subscription based information. The PGW may make any changes to the modification request which may be appropriate according to the PCRF.

Figure 9:
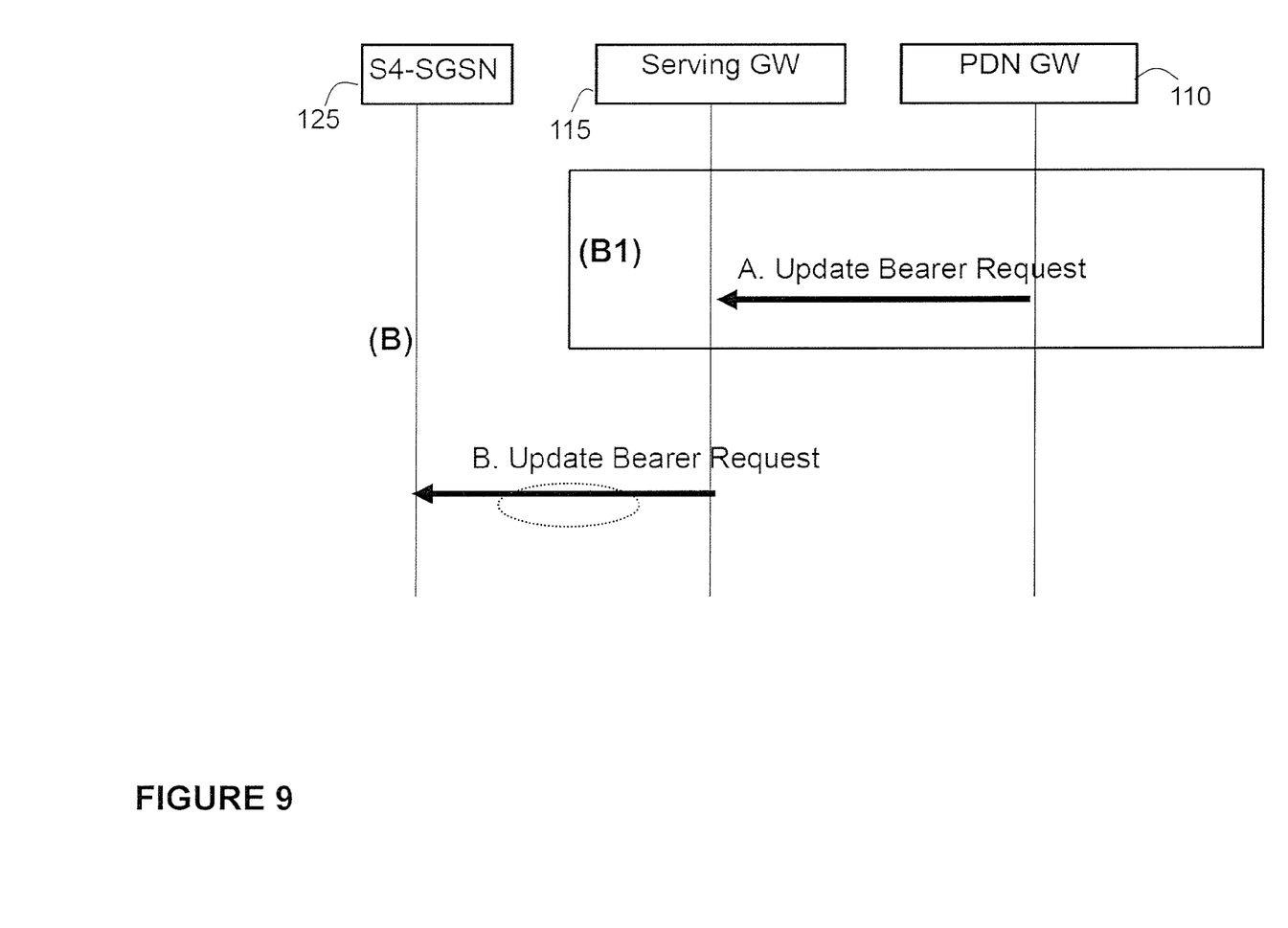

FIG. 9 illustrates an example of an execution portion of a user equipment initiated modification procedure using an S4-SGSN network node. If the request illustrated in FIG. 8 is accepted, the PGW may send an Update Bearer Request message to the SGW (message A). The Update Bearer Request message may comprise an updated EPS Bearer QoS parameter based on any information which may have been received from the PCRF node. The SGW may thereafter send the Update Bearer Request to the S4-SGSN node (message B). The S4-SGSN node may reject the bearer modification request if the received EPS Bearer QoS parameter is higher than the maximum allowed S4-SGSN parameter, according to some of the example embodiments.

It should be appreciated that some of the example embodiments may be applied to RAN initiated RAB modification procedures. In RAN initiated RAB modification procedures, a RAN node may send a RAB modify request message to the S4-SGSN. Typically, for architecture variants using S4 based interaction with SGW and PGW network nodes, the S4-SGSN ignores the RAB modify request message. However, employing the example embodiments presented herein, the S4-SGSN node may initiate a PDP Context Modification procedure.

It should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station). The example embodiments are not limited to LTE, but may apply with any RAN, single- or multi-RAT. Some other RAT examples are LTE-Advanced, UMTS, HSPA, GSM, cdma2000, HRPD, WiMAX, and WiFi.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a S4-Serving General Packet Radio Service Support (S4-SGSN) node for radio resource management, the SGSN node being comprised in a radio network, the method comprising:
   receiving a notification of a secondary Packet Data Protocol (PDP) activation or a PDP content modification procedure, the notification comprising a bearer Quality of Service (QoS) parameter;
   comparing the bearer QoS parameter with a maximum allowed SGSN Quality of Service (QoS) parameter associated with the S4-SGSN node; and
   determining a decision, within the S4-SGSN node, on the secondary PDP activation or the PDP content modification procedure based on the comparing.

2. The method of claim 1, wherein the secondary PDP activation or the PDP content modification procedure is a network initiated or a user equipment initiated.

3. The method of claim 2, wherein the network initiated activation of the PDP content modification is a S4-SGSN initiated modification, a Packet Data Network Gateway (PGW) initiated modification, or a Radio Access Network (RAN) initiated Radio Access Bearer (RAB) modification.

4. The method of claim 1, wherein the step of determining the decision further comprises allowing the secondary PDP activation or the PDP content modification procedure if the bear QoS parameter is less than or equal to the maximum allowed SGSN QoS parameter.

5. The method of claim 1, wherein the bearer QoS parameter is a user equipment requested parameter, the step of determining the decision further comprises restricting the bearer QoS parameter if the bearer QoS parameter is greater than the maximum allowed SGSN QoS parameter.

6. The method of claim 1, wherein the bearer QoS parameter is a Packet Data Network Gateway (PGW) or a Policy Charging and Rules Function (PCRF) provided parameter, the step of determining the decision further comprises rejecting the secondary PDP activation or the PDP content modification procedure if the bearer QoS parameter is greater than the maximum allowed SGSN QoS parameter.

7. The method of claim 1, wherein the step of determining the decision further comprises retrieving subscription data from a Home Location Registrar (HLR) node.

8. A S4-Serving General Packet Radio Service Support (S4-SGSN) node for radio resource management, the S4-SGSN node being comprised in a radio network, the S4-SGSN node comprising:
   a receiving port configured to receive a notification of a secondary Packet Data Protocol (PDP) activation or a PDP content modification procedure, the notification comprising a bearer Quality of Service (QoS) parameter;
   a determination unit configured to compare the bearer QoS with a maximum allowed SGSN Quality of Service (QoS) parameter associated with the SGSN node; and
   the determination unit further configured to determine a decision, within the S4-SGSN node, on the secondary PDP activation or the PDP content modification procedure based on the comparison.

9. The node of claim 8, wherein the secondary PDP activation or the PDP content modification procedure is a network initiated activation or a user equipment initiated activation.

10. The node of claim 9, wherein the network initiated activation of the PDP content modification is a S4-SGSN initiated modification, a Packet Data Network Gateway (PGW) initiated modification, a user equipment initiated modification, or a Radio Access Network (RAN) initiated Radio Access Bearer (RAB) modification.

11. The node of claim 8, wherein the determination unit is further configured to allow the secondary PDP activation or the PDP content modification procedure if the bear QoS parameter is less than or equal to the maximum allowed SGSN QoS parameter.

12. The node of claim 8, wherein the bearer QoS parameter is a user equipment requested parameter, the determination unit is further configured to restrict the bearer QoS parameter if the bearer QoS parameter is greater than the maximum allowed SGSN QoS parameter.

13. The node of claim 8, wherein the bearer QoS parameter is a Packet Data Network Gateway (PGW) or a Policy Charging and Rules Function (PCRF) provided parameter, the determination unit is further configured to reject the secondary PDP activation or the PDP content modification procedure if the bearer QoS parameter is greater than the maximum allowed SGSN QoS parameter.

14. The node of claim 8, wherein the determining unit is further configured to retrieve subscription data from a Home Location Registrar (HLR) node.

* * * * *

UNITED STATES PATENT AND TRADEMARK OFFICE
CERTIFICATE OF CORRECTION

PATENT NO. : 8,204,062 B2
APPLICATION NO. : 13/301817
DATED : June 19, 2012
INVENTOR(S) : Ahlström et al.

It is certified that error appears in the above-identified patent and that said Letters Patent is hereby corrected as shown below:

In Column 7, Line 15, delete "S4-SGGSN" and insert -- S4-SGSN --, therefor.

In Column 9, Line 32, in Claim 4, delete "bear QoS" and insert -- bearer QoS --, therefor.

In Column 10, Line 29, in Claim 11, delete "bear QoS" and insert -- bearer QoS --, therefor.

Signed and Sealed this
Sixth Day of November, 2012

David J. Kappos
*Director of the United States Patent and Trademark Office*